Oct. 9, 1923.
T. J. CURTIS
MEANS FOR OPERATING DAMPERS
Filed April 30, 1923
1,470,425
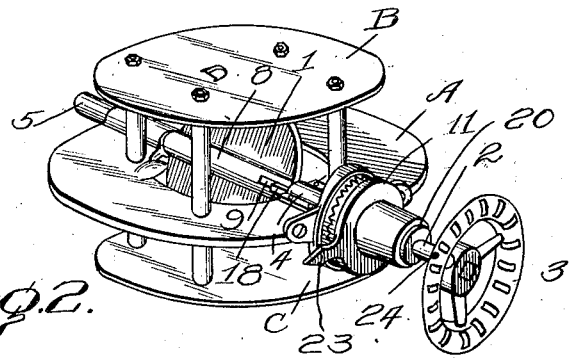
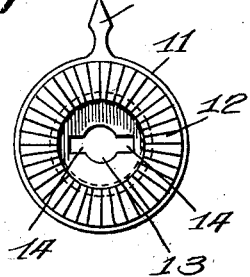
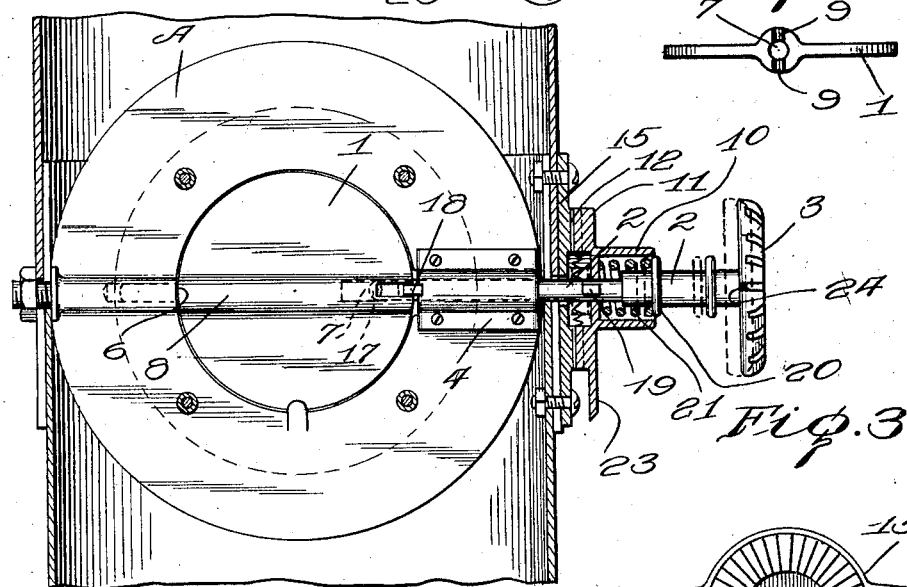
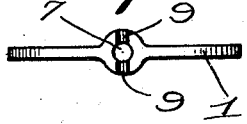
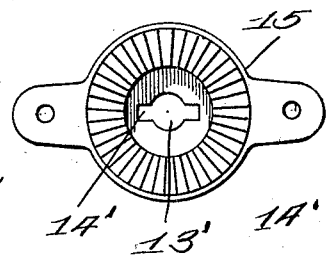
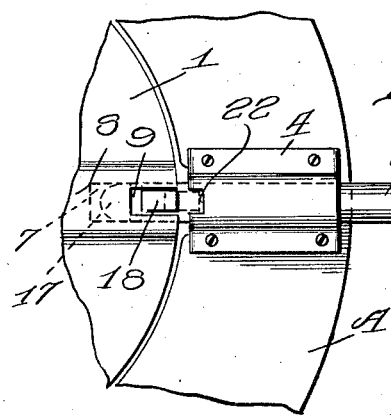
Inventor
Thomas J. Curtis
By A. N. Dunn
Attorney Patented Oct. 9, 1923.

1,470,425

UNITED STATES PATENT OFFICE.

THOMAS J. CURTIS, OF LOS ANGELES, CALIFORNIA.

MEANS FOR OPERATING DAMPERS.

Application filed April 30, 1923. Serial No. 635,554.

*To all whom it may concern:*

Be it known that I, THOMAS J. CURTIS, a citizen of the United States of America, residing at Los Angeles, in the county of Los Angeles and State of California, have invented certain new and useful Improvements in Means for Operating Dampers, of which the following is a specification, reference being had therein to the accompanying drawing.

This invention relates to means for operating dampers, and more particularly dampers of the type disclosed in my Patent No. 1,434,529, issued November 7, 1922.

In certain damper constructions, such as disclosed in the aforesaid patent, a relatively large ring, of a diameter approximately the same as the stove pipe, is interiorly provided with a pivoted damper, and it is necessary to provide means whereby the ring and damper may be rotated together as a draft regulator, and also whereby the damper may be rotated independently of the ring.

The object of my invention therefore, is the production of instrumentalities whereby the ring and damper may be rotated as a whole, or whereby the damper may be rotated irrespective of the ring.

Other objects of the invention will be made clear in the following specification, when read in connection with the accompanying drawing forming a part thereof.

In said drawing

Figure 1 is a perspective view showing the operating means connected to a damper of the type aforesaid.

Fig. 2 is a partial section taken through a pipe in which the damper is installed.

Fig. 3 is a front plan view of a ratchet member forming a part of my invention.

Fig. 4 is a detail showing means whereby the damper and ring may be detachably connected for rotation.

Fig. 5 is a front plan view of a second ratchet plate forming a part of my invention, and Fig. 6 is an edge view of the valve which is a part of my invention.

Referring specifically to the drawing, I have herein shown the specific type of damper disclosed in my patent heretofore referred to. The structure embodies a flat, circular ring A, and upper and lower disks B and C, respectively, a damper or valve 1 being pivotally mounted in the opening in said ring A, and adapted to turn with the ring, or independently thereof, as will presently appear.

An operating shaft 2, provided with a handle 3, extends across the ring A, being prevented from separation therefrom by means of a plate 4, secured to the ring by screws or bolts, and having an upwardly curved body portion forming a bearing to permit rotation of the shaft 2.

The composite damper described is usually installed in a stack, at one of the joints thereof, the shaft 2 resting in slots formed in the top periphery of the bottom section of the joint, the top section thereof being similarly slotted, the two slotted portions also forming a bearing permitting rotation of the shaft 2. The opposite side of the ring A is provided with a short stub shaft 5, adapted to be similarly supported in notches, to permit rotation of the ring A.

The valve 1 is supported in the ring by means of a short stub shaft 6, extending into the body of the ring A, as shown in dotted lines, Fig. 2. The inner end of the shaft 2 terminates within an aperture 7 formed in the adjacent periphery of the valve 1, as shown in dotted lines Fig. 4. It is clear that, because of the described method of mounting the valve 1, it may be turned or pivoted irrespective of the ring A.

The valve 1 is cast with the raised portion 8, and a slot 9 is formed on each side of said aperture 7, for a purpose to be described.

Carried upon and surrounding the outer portion of the shaft 2, is a collar 10, terminating in an enlarged circular plate 11, the inner surface of which is provided with ratchet teeth 12. The plate 11 is apertured at 13 to permit passage of the shaft 2, and kerfs 14 are cut on each side of the aperture 13, as shown in Fig. 5. A ratchet plate 15, having teeth 16, is secured to the pipe, and is centrally provided with an aperture 13' and kerfs 14', 14', exactly similar to the aperture and kerfs at 13, in the plate 11, except that a line drawn through the kerfs of the plate 15 would lie in a plane at a right angle with a similar line drawn through the kerfs 13, on the plate 11, when assembled as shown in Fig. 2. The end 17 of the shaft 2, is somewhat tapered to facilitate rotation in the aperture 7. Adjacent the end 17, the shaft is provided with diametrically opposed projections 18, of a size permitting passage thereof through the kerfs of the plate 15, and entry into the slots 9 on the valve 1. About midway of the shaft 2, are additional diametrically positioned projections 19, similar to the projections 18, and adapted to pass through the kerfs 14 on the plate 11. Between the handle 3 of the shaft, and the projections 19, is a peripheral flange 20, and a coiled spring 21 is positioned in front of the flange 20, to surround the shaft 2.

The plate 4, on the ring A is provided, above and below the ring, with notches 22, opposite the notches 9, in the valve 1, for a purpose to be described.

In assembling the device to the position shown in Fig. 2, the shaft 2 is projected through the collar 10, and the plates 11 and 15. The plate 4 is then lifted from the ring A, and the shaft is laid on said ring, the end 17 thereof being inserted in the socket 7. The plate 4 is then fastened to the ring, securing the shaft in position. In this position, as shown in full lines, Fig. 2, the projections 19 are in the kerfs 14 of the plate 11, and a portion of each of the projections 18 is in the slot 9 of the valve 1, and another portion in notches 22 of the ring A. There is very little tension on the spring 21, and the teeth of the plates 11 and 15 are loosely in engagement. Rotation of the shaft 2, by means of the handle 3, will cause rotation of the ring A, together with a similar rotation of the valve 1, since the projections 19 lock the ring and valve against relative rotative movement, the plate 11 rotating with the shaft 2, and the teeth of said plate sliding loosely over the teeth of the plate 12, there being sufficient resistance however to prevent gravitation of the ring and valve from the set position. It is obvious that, if the composite damper is thus rotated through an angle of 45° the draft would be fully open, which is desirable at certain times.

When it is desired to partially close the draft, the ring A is allowed to remain in the position shown in Fig. 2, and the draft is regulated by manipulation of the valve 1. In order to rotate the valve 1, without a simultaneous rotation of the ring A, the handle 3 is first pushed inwardly, to a position shown in dotted lines in Fig. 2, the projections 19 being pushed entirely through the kerfs 14. At this time the projections 18, near the end of the shaft 2, have been pushed out of the notches 22, in the plate 4, but are of course still engaged in the slots 9 of the valve 1, as shown in full lines Fig. 4. In this position of the handle 3, any rotation thereof will obviously turn the valve 1 independently of the ring A. The inward movement of the handle 3 has compressed the spring 21, between the flange 20 and the rear face of the plate 11, and has caused the projections 19 to be moved inwardly and out of register with the kerfs 14 and rotation of said shaft in this position will move the projections 19 to the position shown in dotted lines Fig. 2. The shaft 2 is not only free to turn, without engagement with the plate 11 or the ring A, but is prevented, by the projections 19, from returning to the full line position shown in Fig. 2, until the shaft has been rotated sufficiently to bring the said projections back into register with the kerfs 14. When such alignment is effected, the projections snap back into engagement with said slots, under the influence of the spring 21, assuming the position shown in full lines in Fig. 2, and any further rotation of the shaft will rotate both the ring and valve.

It will be noted that the spring 21 not only provides means for automatically retracting the shaft 2, to engage the ring A, as described, but also furnishes the necessary friction to hold the valve 1 in any set position relatively of the ring A. When the projections 19 are forward of and out of alignment with the kerfs 14, the spring 21 is constantly exerting a backward pull upon the shaft, and holding the projections 19 in close contact with the face of the plate 11. Such contact offers sufficient resistance to prevent undesired shifting of the valve, as will be clear.

In order to indicate the position of the ring A, in the stack, a pointer 23 is carried by the plate 11, as shown, and is positioned so that it always points in a line parallel with the plane of the ring A. Since the ring A cannot be rotated unless the plate 11 is also rotated, it is clear that the pointer 23 will always indicate the angular inclination of the ring.

An indicating star, arrow, or other mark 24, is carried preferably by the periphery of the handle 3, to at all times indicate the position of the valve 1. Since the handle 3 cannot at any time be rotated without rotating the valve, it is clear that the indicating mark 24 will always properly show the position of the valve. Obviously said mark 24 may be positioned anywhere on the handle 3, or upon any exposed portion of the shaft 2.

It is manifest that, by the construction specified, I have provided means whereby the shaft 2 may be utilized to efficiently rotate the combined ring and valve, or the valve independently of the ring, at the same time frictionally retaining the ring and valve, or the valve alone, in the desired set position.

Modifications of my invention may be suggested to those skilled in the art, but my invention covers all such embodiments as fall fairly within the scope of the appended claims.

What I claim is:

1. The combination with a damper comprising two rotative members, of a shaft adapted to rotate said members in unison, said shaft being longitudinally movable to a position whereby rotation of the shaft will rotate one only of said members, substantially as described.

2. The combination with a damper comprising two pivoted members, of an operating shaft engaged at all times with one of said members, and movable longitudinally whereby to be brought into engagement with the other member, substantially as described.

3. The combination with a damper comprising a pivoted ring and a pivoted valve, of an operating shaft connected to said valve at all times, and longitudinally movable to a position to operatively engage said ring, and resilient means exerting its influence to move said shaft to said position, substantially as described.

4. The combination with a damper comprising a pivoted ring and a pivoted valve, of an operating shaft connected to said valve at all times, said shaft being longitudinally movable to a position to also engage said ring, and resilient means exerting its influence to engage said shaft with said ring, and also to retain said ring and valve in any position to which they have been rotated by said shaft, substantially as described.

5. The combination with a damper mounted in a stack, and comprising a ring and a valve, both mounted for rotative movement, of an operating shaft movable laterally of said ring and damper, and carrying projections engaging the valve at all times, and engaging the ring in certain positions only of said shaft.

6. The combination with a damper mounted in a stack, and comprising a ring and a valve, both mounted for rotative movement, of an operating shaft engaging said ring and valve, and movable into position to engage said valve only, and means preventing re-engagement with said ring during certain positions of rotation of said shaft, substantially as described.

7. The combination with a damper mounted in a stack, and comprising a ring and a valve both mounted for rotative movement, of an operating shaft engaging said ring and valve, and movable into position to engage said valve only, means for preventing re-engagement with said ring during certain positions of rotation of said shaft, and a spring tending to restore said shaft to ring-engaging position at certain other positions of rotation of said shaft.

8. The combination with a damper mounted in a stack, and comprising a ring and a valve both mounted for rotative movement, of an operating shaft engaging said ring and valve, and movable into position to engage said valve only, means for preventing re-engagement with said ring during certain positions of rotation of said shaft, and a spring tending to restore said shaft to ring-engaging position at certain other positions of rotation of said shaft, said spring also operating to cause frictional resistance to all rotative movements of said shaft, substantially as described.

9. The combination with a damper mounted in a stack, and comprising a ring and a valve both mounted for rotative movement, of an operating shaft extending through the stack and engaged with the valve at all times and movable to a position to engage said ring, a ratchet plate carried by the stack, a second ratchet plate carried by the shaft, means carried by the shaft preventing rotation of the latter relatively to said second plate while the shaft is in engagement with the ring, said means permitting rotation of said shaft relative to said plate, while the shaft is out of engagement with said ring, substantially as described.

10. The combination with a damper mounted in a stack, and comprising a ring and a valve both mounted for rotative movement, of an operating shaft extending through the stack, and into the body of said valve, and a projection on said shaft adapted to simultaneously engage a notch in said valve and a notch in said ring, said shaft being longitudinally movable to a position whereby said projection is disengaged from the notch in said ring, substantially as described.

11. The combination with a damper mounted in a stack, and comprising a ring and a valve both mounted for rotative movement, of an operating shaft extending through the stack, and into the body of said valve, a projection on said shaft adapted to simultaneously engage a notch in said valve and a notch in said ring, said shaft being longitudinally movable to a position whereby said projection is disengaged from the notch in said ring, and a spring carried by said shaft and exerting its influence to restore said shaft to a position whereby said projection is engaged with the notch in said ring, substantially as described.

12. The combination with a damper mounted in a stack, and comprising a ring and a valve both mounted for rotative movement, of an operating shaft extending through the stack and at all times operatively engaging said valve and adapted for longitudinal movement to engage said ring, a plate carried by said shaft outside of the stack and provided with an elongated aperture through which the latter extends, and a projection carried by the shaft and adapted to extend into said aperture and rotate said plate upon rotation of the shaft, said projection being adapted to pass through said aperture and frictionally engage the inner face of said plate, when the shaft is out of engagement with said ring, substantially as described.

13. The combination with a damper mounted in a stack, and comprising a ring and a valve both mounted for rotative movement, of an operating shaft extending through the stack and at all times operatively engaging said valve and adapted for longitudinal movement to engage said ring, a plate carried by said shaft outside of the stack and provided with an elongated aperture through which the latter extends, a projection carried by the shaft and adapted to extend into said aperture and rotate said plate upon rotation of the shaft, said projection being adapted to pass through said aperture and frictionally engage the inner face of said plate, when the shaft is out of engagement with said ring, and a compression spring carried by said shaft and exerting its influence to move said shaft into engagement with said ring, substantially as described.

In testimony whereof I hereunto affix my signature.

THOMAS J. CURTIS.